US006973322B2

(12) United States Patent
Buchmann et al.

(10) Patent No.: US 6,973,322 B2
(45) Date of Patent: Dec. 6, 2005

(54) PERSONAL TRAVEL AGENT USING PUSH SERVICES

(75) Inventors: Cornelius Buchmann, Marne (DE); Christian Kirsch, Schildow (DE); Gerhard Schrimpf, Hosenfeld (DE); Stephan Schwarzer, Hamburg (DE); Rainer Seibert, Hamburg (DE)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 10/324,351

(22) Filed: Dec. 19, 2002

(65) Prior Publication Data

US 2003/0125049 A1 Jul. 3, 2003

(30) Foreign Application Priority Data

Dec. 22, 2001 (EP) .................................. 01130761

(51) Int. Cl.[7] ........................ H04Q 7/20; H04M 11/04; H04B 7/00; G08G 1/09; G06G 7/70

(52) U.S. Cl. ............................... 455/456.3; 455/404.2; 455/440; 455/441; 455/456.1; 455/457; 455/517; 340/905; 340/995.13; 701/117

(58) Field of Search ............................. 455/456, 404.2, 455/440, 441, 456.1, 456.3, 457, 517; 705/5, 705/6; 340/905, 995.13; 701/117

(56) References Cited

U.S. PATENT DOCUMENTS

| | | | | |
|---|---|---|---|---|
| 6,711,399 | B1 * | 3/2004 | Granier | 455/404.1 |
| 6,731,940 | B1 * | 5/2004 | Nagendran | 455/456.1 |
| 6,741,926 | B1 * | 5/2004 | Zhao et al. | 701/201 |
| 6,748,364 | B1 * | 6/2004 | Waytena et al. | 705/5 |
| 6,813,608 | B1 * | 11/2004 | Baranowski | 705/6 |
| 2001/0034624 | A1 * | 10/2001 | Niwa | 705/5 |
| 2002/0198002 | A1 * | 12/2002 | Ghandeharizadeh et al. | 455/456 |
| 2003/0036823 | A1 * | 2/2003 | Mahvi | 701/1 |

OTHER PUBLICATIONS

South German Newspaper No. 198, Aug. 29, 2001, p. 5, "Handy meldet: Freunde in der Nähe".

* cited by examiner

*Primary Examiner*—William Trost
*Assistant Examiner*—Wesley Kim
(74) *Attorney, Agent, or Firm*—Duke W. Yee; John R. Pivnichny; Betty Formby

(57) ABSTRACT

A method and system for providing and receiving location-based services for a planned trip of a user having access to a portable telecommunication device. The user creates, e.g., via the Internet, a trip profile. The profile contains base data about the user and the trip. After the profile is created at the Service provider's site, a scheduled delivery of information is activated. The position of the user is computed repeatedly during the trip. When new messages are available for an individual user at his individual current position, the user receives the information. If the information does not match the user's needs, he is able to react and submit his current position in order to receive the right information.

4 Claims, 3 Drawing Sheets

PERSONAL TRAVEL AGENT USING PUSH SERVICES

FIELD OF THE INVENTION

The present invention relates to the field of mobile telecommunication. In particular, it relates to a method and system for providing and receiving location-based services for a user having access to a portable telecommunication device.

BACKGROUND

Commercial delivery of location-based services is a growing segment of the economy. These services are more promising and accepted by the user to the degree that they are low-cost, respectful of privacy, and selective of content so that they do not flood the user with too much information or with junk content.

The important technical device at the user site is a mobile telecommunication device, i.e., a mobile phone, for example according to the GSM standard.

Mobile phones are often equipped with a Wireless Application Protocol (WAP) browser. This WAP browser enables the mobile telephone to connect to the Internet through a WAP Gateway and access sites that use the Wireless Markup Language (WML).

Most people, however, do not use the services offered by the wireless Internet, although it is now possible to pull information, and in particular location-based information, from the Internet. The reason is that WAP services are thought to be slow, expensive and without any concrete benefit, because the user has to work through a plurality of forms in order to transmit his current location. Further, there are many situations, e.g., when he travels foreign cities, etc, in which a user does not know his location, e.g., a postal code location identification.

One beneficial feature is the capability to access information that is specially processed for the current position of the user without requiring the user to enter his current position manually. Examples of such Location Based Services (LBS) are:

Services that answer questions regarding the location of the next hotel, restaurant, or automatic teller machine, Car Fleet Management, and Traffic information Currently there are at least two different approaches to ascertain the position of a mobile telephone in a cellular network.

The first of these is the Global Positioning System (GPS): GPS is a worldwide radio-navigation system formed from a constellation of 24 satellites and their ground stations. GPS uses the satellites as reference points to calculate positions accurate to a matter of meters. In order to use GPS for Location Based Services, a GPS receiver has to be added to every mobile phone which is to be located. This is unacceptably expensive for most users. Another disadvantage is that additional technical equipment is required within the infrastructure of the mobile service (GSM) provider to use the information of GPS. Thus, costs further increase.

A second way to find the position of a mobile telephone is to use additional localization techniques inside the cellular communication network:

A respective publication is an article in a newspaper “Süddeutsche Zeitung”, issued in Germany, Nr.198, VP2, p.5, dated from Aug. 29, 2001.

A mobile network is separated into cells. In every cell a so-called base station is located. The mobile service provider knows the geographical position of the base station and the spatial dimension of the cell. WAP may be used to pull or push only information to the user’s mobile phone which is relevant to his current location.

As in the case of using GPS, some additional technical and software equipment is required in the infrastructure of the mobile service provider, to use this information. This is expensive and slow as well.

SUMMARY

The invention includes a method and system for providing location-based services to a user who has access to a portable telecommunication device, characterized by the steps of:

a) receiving user information comprising base data about a trip planned by a user, and a user ID for contacting him; the base data comprises information about times and corresponding locations associated with the trip, b) collecting service information associated with the trip from predetermined information resources, and c) transmitting the service information for receipt by the user as the user progresses in the trip.

The invention also includes a method and system for a user to receive location-based service information with a mobile telecommunication device during a trip, in which method a trip schedule comprises relevant time and corresponding location information about the trip. This is characterized by the step of receiving the service information scheduled according to the trip schedule.

Thus, the Provider receives the location information of a trip intended by the user, transmitted by the user before the trip begins. The user may send the base data of the trip via the Internet, or by phone call, or even by fax communication if desired. The base data of the trip comprise advantageously:

start and destination locations;

the mobile telephone number as the User ID and feedback address;

the day of the journey;

the planned time of departure; and the estimated average speed or arrival time.

In case the estimated speed or arrival time is missing, reasonable default values may be applied instead.

Of course, not much time is required in advance because nearly all the steps of the inventional method can be performed automatically and computerized, and thus may be performed quickly. The Service Provider may collect the service information from a content database provided and maintained at his site or by a third party, or may assemble adequate information by aid of a separate application program via the Internet.

The service information is then prepared, possibly sorted according to relevance and/or other criteria, such as traffic information or cultural information, and is then communicated to the user just in time. This is done by any suitable means, for example, by e-mail, phone call, SMS, WAP or other message. The communication process can be part of a broadcast or multicast process, or even monocast, for example when contacting the user by a phone call. “Just in time” means that the service information content matches the current or estimated location of the user.

A user, who wants to receive location based information, creates a profile. This can be done via the Internet from an ordinary Personal Computer as described later below with reference to FIG. 2. The profile contains data about the user and the trip.

After the profile is created, a scheduled delivery of information is activated. The position of the user is computed repeatedly. When new messages are available for an individual user at his individual current position as assumed by the Service Provider, the user gets the information he selected on the trip (refer to FIG. 3). If the information does not match the user's needs, for instance because it does not match his current position, he is able to react and submit his current position in order to receive the right information.

As a person skilled in the art may appreciate, the present invention combines the advantages of pulling and pushing service information. The Service provider may push service information concurrently to more than one user, who request the same type and same content of service information at the same time. Thus, he can select a communication medium which is adequate to such a situation. In this case an SMS, or an e-mail if possible is preferred, as this communication medium is able to transport multicast messages. Or, in a case in which the user-associated inventive software/hardware equipment is integrated within an automotive routing application system or navigation system, users may receive only such traffic information which is relevant for their current position and/or for their intended destination.

For the user the inventive system has a pull-like character, because he receives only the information which has relevance for him. Otherwise he needs not request repeatedly the current news once his trip schedule is registered at the Service Provider.

Furthermore, the inventive method is very flexible as to the communication medium in use: if only a few persons are concerned, a phone call to each can be selected by the Service Provider as the best solution. Further, the communication medium may also be selected in dependence on the type of service information. For example, service information which is assumed to provoke additional questions from the users, which questions may be assumed in advance to be individual in nature, can be transmitted by a phone call.

Further, the inventive method provides the flexibility to integrate more than the above mentioned base data for the trip. For example, when the user selects "car" for transportation means, and selects "alone" for "number of passengers in group", then the sending of SMS messages should be avoided because the user must be assumed to drive the car himself and should not be distracted from doing this.

Furthermore, user autonomy is maintained because the user himself requests the data delivery. Further, no GPS equipment is required for determining the user's current location. Further, no triangulation hardware and software is required for determining the user's current location. Thus, costs are saved.

When, further advantageously, the user transmits current (possibly corrected) location information to the Service Provider, and when the method associated with the Service Provider's equipment further comprises the steps of:

a) receiving current location information for updating the trip schedule,
b) determining the current location of the user, and
c) transmitting service information valid for the trip segment between the current user location and the destination location, then a trip schedule can be adapted to the user's current position, in case the user's trip did not progress as originally intended. This is especially relevant for providing traffic information, or other time-critical information.

When, further advantageously, a user message includes information on signal strength and other communication control data, such as the ID of the relevant base stations of the GSM provider, both types of information within the content transmitted by a current call, then the Service Provider is able to derive and thus determine automatically the location of the user without evaluating the content of the call. This may be done either by cooperation with the GSM provider or independently. Thus, a user call needs not necessarily be serviced by staff, but instead can be evaluated automatically, program-driven. As a person skilled in the art will appreciate, the mobile phone application software requires an interface to the local operating system which manages this kind of traffic control data. An advantage is that the user need not make a phone call when driving a car, for example.

BRIEF DESCRIPTION OF THE DRAWINGS

The present invention is next illustrated by way of example and drawings in which.

DETAILED DESCRIPTION

Figure 1:
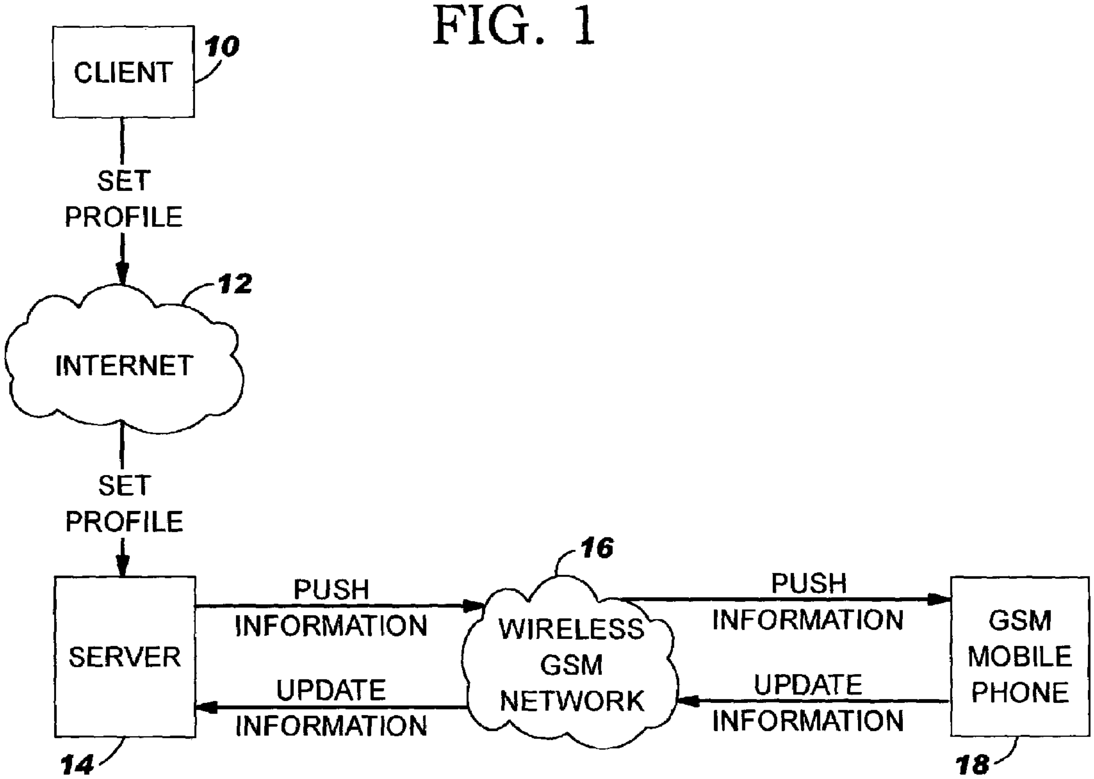
FIG. 1 is a schematic illustration showing an overview of components that are involved in the process of sending location based information to a mobile device according to a preferred embodiment of the present invention.

With general reference to the figures and with special reference now to FIG. 1 a short overview is given introducing the main components that are involved in the inventive process of sending location-based information according to a preferred embodiment thereof.

A client 10 who wants to use the location-based services and wants to receive location-based information first indicates to the service provider some important details concerning the trip during which he wants to receive the service information. This is referred to as base data of the trip as was mentioned above. The client 10 accesses an Internet 12 website of the provider of the location-based services and enters details into a form provided within the website. Thus, the trip data is stored at a webserver 14 of the service provider. The service provider reads this user information and collects data corresponding to the intended trip. At the time of the intended trip, the service provider sends the information previously collected via a wireless GSM network 16 to a mobile phone 18 of the client 10. This is done repeatedly according to the current progression of the client's trip as illustrated by the branch from left to right between server 14 and mobile phone 18 in FIG. 1. The client 10 receives a respective call or SMS or other message and receives the information addressed to him. Thus, he is informed about important things, which he indicated previously to the service provider, during his trip. The service information may also be pushed to a plurality of clients, as described earlier, when appropriate.

Whenever necessary, the client (user) 10 calls the server 14 by aid of his mobile phone 18 and transmits his current location in order to update the trip schedule. Thus, a prescribed location/time schedule stored at the server 14 can be updated as desired. This ensures that the user (client) 10 receives basically always service information which matches his current location.

Figure 2:
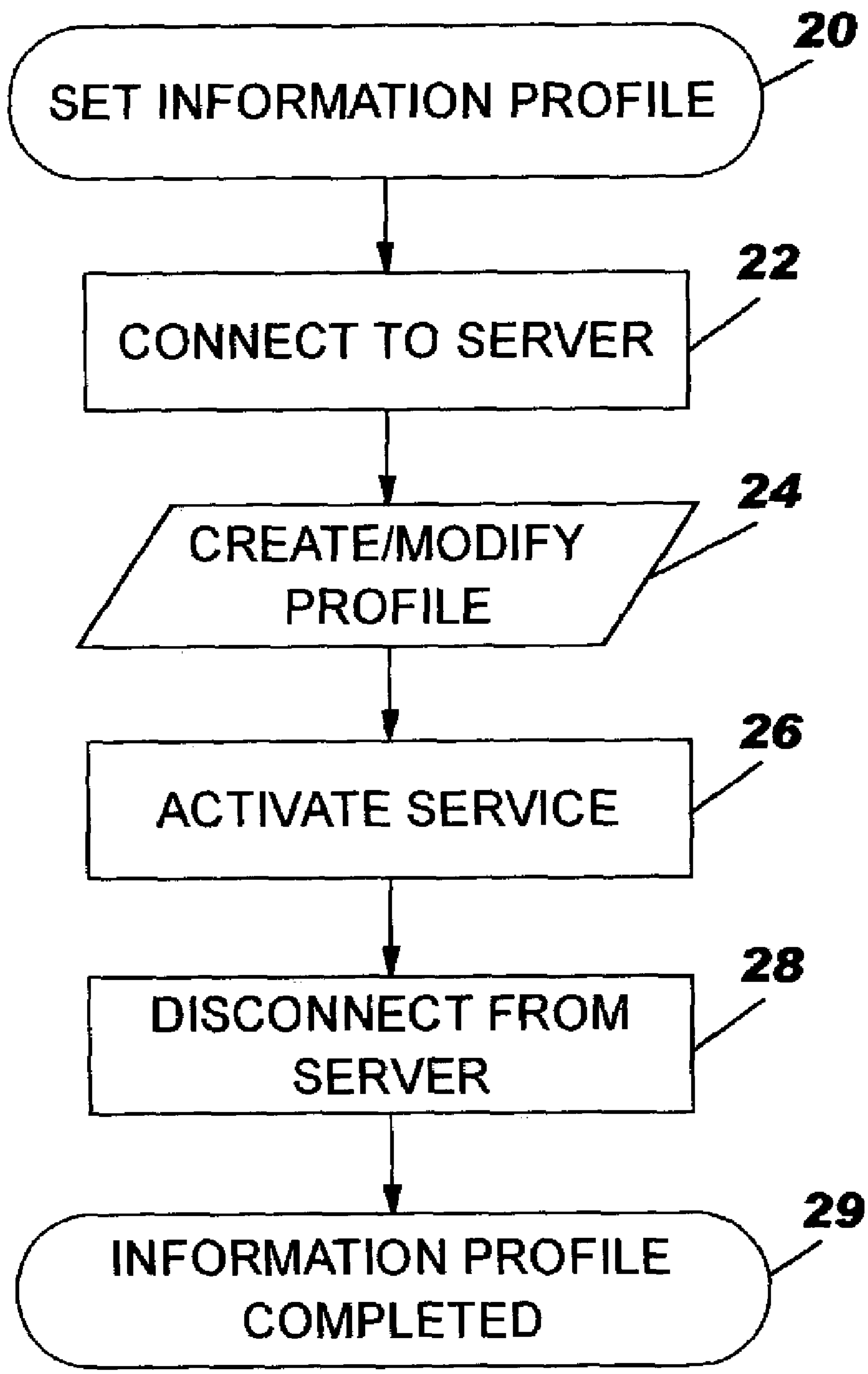
FIG. 2 is a schematic illustration showing the process of configuring the profile which controls the delivery of the information to the mobile device according to a preferred embodiment of the present invention.

With further reference now to FIG. 2 the process is illustrated in which the trip data is transmitted to the server 14. All relevant trip data, for example the start location and destination location, the start time and estimated arrival time, the mobile telephone number of the client 10, the date of the planned trip, the name of the client 10, and if available an e-mail-address for contacting the client 10 redundantly in addition to contacting him via mobile phone is registered in a so-called "information profile". The setting of the information profile, step 20, comprises a plurality of steps, exemplarily described as follows:

The user 10 connects, step 22, to the Webserver 14 via Internet, and uses a user-ID and password provided for him at the website in order to enter the above-mentioned data into a form to which he has access at the website. The form may contain additional data depending on the nature of trip and user preferences. Thus, by filling in the form, the information profile will be created. The client 10 is enabled by his user-ID and password to edit the form in order to correct mistakes, and so forth, if necessary. Privacy is maintained by any suited means according to prior art methods. This is done in step 24.

After all data has been filled-in, the client 10 is asked to explicitly confirm that he is really willing to be serviced and that he agrees to transmit his personal data and the personal trip data to the service provider, in order to be compliant to any data privacy requirements possibly imposed by law. This is a prerequisite to getting the service request activated, step 26. Activation means that the trip data contained within the information profile is stored and input into a dedicated program at the service provider's site which manages the actual services. This is later described with reference to FIG. 3. After the service has been activated, the user 10 disconnects from the server, step 28, and the setting of the information profile has completed, step 29.

Figure 3:
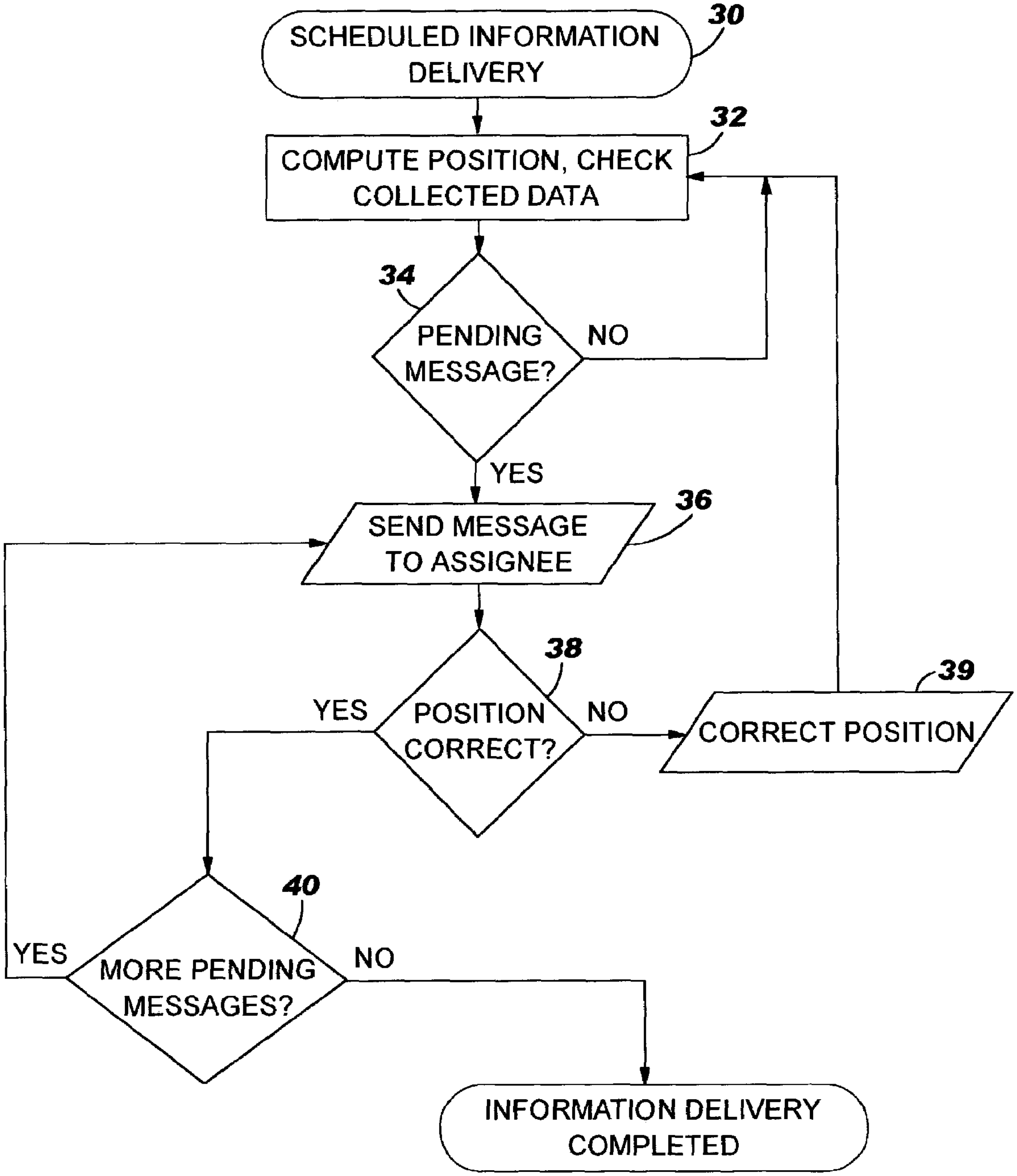
FIG. 3 is a schematic illustration showing the process of delivery including the correction of the actual position of the mobile user according to a preferred embodiment of the present invention.

With further reference now to FIG. 3 more details are given about the process of information delivery as a part of the service. The service provider uses for example a database which stores datasets containing content information relevant for any respective location or location segment within a given geographical region. Assume a case in which a trip is planned that starts in Hamburg, Germany and ends in München, Germany. The trip is done by a car using the shortest highway connection between those two Cities. The route which is defined by a geographical line represented by the highway connection touches some number of Cities, for example Hannover, Kassel, Würzburg, Nürnberg. Further, it touches other attractive geographical locations, like an attractive waterfall situation or a particular landscape, or other attraction including commercial attractions, as for example an amusement-park, particular restaurants, or the like.

According to the inventive embodiment, the datasets of the service provider's database contains interesting content information about the above-mentioned attractions. By importing the trip data comprising location information and time information into a scheduler program, a merge is done between trip data and the respective datasets which are associated with a respective individual trip.

Thus, a trip schedule is created by the trip scheduler program which comprises a sequence of datasets and respective sending time information. The sending time information is calculated simply by determining or reading an average speed directly from the user input, for example one hundred kilometres per hour on the highway. The estimation can be done autonomously by the scheduler program or can be based on the time difference between start time and envisaged arrival time as set out within the information profile by the user. Thus, for example, and with reference to the above-mentioned trip between Hamburg and München a sequence of 15 datasets is scheduled with respective realistic sending time information. The start of sending is triggered by the information given in the information profile for the start of the trip.

In more detail, in a step 32 the current position of the client 10 is computed by estimation, as described above. Then, in a next service information collection step 34 a check is performed if a message for the client 10 is due, i.e. is pending to be sent. This is simply done by comparing the scheduled sending time of the first dataset with the current time. When the current time is later than the scheduled time, see the YES-branch of decision 34, a respective service message is sent to the assignee, i.e. the client 10, from FIG. 1. Otherwise, when it is too early, the process branches back to step 32 in order to repeat the computation of the position after a predetermined minimum time interval, e.g. after one minute.

Next, and with reference to step 38 in FIG. 3 the service message is received by the client 10. In particular when the first message of the trip has been successfully received the client 10 has the possibility to issue an answer to the service provider saying, whether his actual location coincides sufficiently precisely with the actual location within the trip schedule currently processed at the site of the service provider. In case the position is not correct, the user can send a description of his current position to the service provider, e.g. via short message service (SMS), or in WAP-form, or via a telephone call to a respective call-center residing at the service provider, or this is done automatically as described above.

In this case the service system at the service provider corrects the pointer within the trip schedule in order to point to the correct position. Then, the procedure is repeated as described above.

When the position is correct, see the YES-branch of decision 38, the client 10 gets only the particular traffic news or service information which is relevant to him. Further it is checked, see decision 40, if there are more pending messages provided for the client 10 within the trip schedule which are also due at the current time to be sent to him. In case there is a further message the process branches back to step 36 in order to send it to the client. Otherwise the information delivery has been completed for the current moment in time. Then the process branches back to step 32 for a repeated calculation of the current position of the user. It should be understood that the control flow given in FIG. 3 is then repeated periodically during the whole trip. At the end of the trip, all the messages were sent according to the trip schedule provided by the service provider.

Further, and with respect to the plurality of different application fields for the present invention, it should be noted that the steps 38/39 of FIG. 3, i.e. the steps in which a position is corrected initiated by the user, may be varied in order to be performed more or less automatically without a major interaction required by the user himself. For example an inventive software module of the mobile phone of the client 10 has an interface to the mobile phone operating system. This interface can be used for reading the signal strength used for sending the current location of the user. As is known in the art, the signals of mobile phones are usually received by more than one base station, and a feedback signal is transmitted to the calling phone in order to possibly decrease or increase the current signal strength. After a short time a quasi-constant signal strength will be achieved by the mobile phone. The signal strength can be evaluated together with the feedback signals from the other base stations to which a concurrent contact exists, in order to determine the current location of the user. Thus, for example when a base station A receives the signal with a very high signal strength, it can be concluded that the mobile phone is in the near environment of this base station. In combination with the respective signal strengths which the other base stations have received, the location can be determined quite precisely. Generally, the smaller the current cell, the more precise the determination of current location.

It should be understood that the inventive concepts can also be integrated into existing method and apparatus for telecommunication devices or the like. For example into a software module of a route-planning application or navigation system used within a car. Further, the inventive concepts can also be modified according to the respective requirements present in other traffic situations, e.g. for pedestrians who move through a city or any type of landscape, or for passengers of a train, or even aircraft, or a ship. The main advantage is that any major investment of additional hardware, for example to use the global positioning system (GPS) for determining the current position of the user, is not required when using the present invention.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;

b) reproduction in a different material form.

We claim:

1. A method for providing location-based services for a user having access to a portable telecommunication device, comprising the computer-implemented steps of:

receiving, from a user, the following information regarding a driving trip (a) a contact number or contact address for the portable telecommunication device, (b) a start location, (c) a destination, and (d) an estimated average velocity or estimated arrival time at the destination, wherein if the user does not supply an estimated average velocity or estimated arrival time, a standard value is inserted;

using a trip schedule, set up according to the start location, the destination, and one of estimated average velocity, estimated arrival time, and standard value, to determine an estimated location at a given time; and transmitting information that includes current traffic information for the estimated location to the portable communication device at the given time.

2. The method of claim 1, further comprising the steps of:

receiving a call from a user to provide a current location, wherein the method is capable of determining the current location both from a user description of location and from receiving information on signal strength and communication control data from the telecommunication device;

updating the estimated location used for transmission of current traffic information.

3. The method of claim 1, further comprising the steps of:

updating the estimated location used for transmission of current traffic information through an automotive routing application system or navigation system integrated with the telecommunications device; and providing traffic information which is relevant for the user's current position or the intended destination.

4. The method of claim 1, further comprising the steps of:

collecting service information associated with said trip from predetermined information resources; and transmitting said service information for receipt by the user scheduled according to the estimated location.

* * * * *